US012231514B2

(12) United States Patent
Wu et al.

(10) Patent No.: US 12,231,514 B2
(45) Date of Patent: Feb. 18, 2025

(54) METHOD AND APPARATUS FOR GENERATING PREDICTION INFORMATION, ELECTRONIC DEVICE, AND COMPUTER READABLE MEDIUM

(71) Applicant: Beijing Bytedance Network Technology Co., Ltd., Beijing (CN)

(72) Inventors: Liangchao Wu, Beijing (CN); Lizhe Zhang, Beijing (CN); Junyuan Xie, Beijing (CN); Di Wu, Beijing (CN); Jun Zhang, Beijing (CN); Cheng Chen, Beijing (CN); Longyijia Li, Beijing (CN); Chenliaohui Fang, Beijing (CN); Kan Liu, Beijing (CN); Long Chang, Beijing (CN); Long Huang, Beijing (CN); Yixiang Chen, Beijing (CN); Xiang Wu, Beijing (CN); Peng Zhao, Beijing (CN); Xiaobing Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 17/882,397

(22) Filed: Aug. 5, 2022

(65) Prior Publication Data
US 2022/0385739 A1     Dec. 1, 2022

Related U.S. Application Data

(63) Continuation of application No. PCT/CN2021/080634, filed on Mar. 12, 2021.

(30) Foreign Application Priority Data

Apr. 8, 2020   (CN) .......................... 202010270721.X

(51) Int. Cl.
*H04L 67/55*    (2022.01)
*G06F 21/62*    (2013.01)

(52) U.S. Cl.
CPC .......... *H04L 67/55* (2022.05); *G06F 21/6254* (2013.01)

(58) Field of Classification Search
CPC ............. H04L 63/0407; H04L 63/0414; H04L 63/0421; G06F 21/6254; G06F 21/6245;
(Continued)

(56) References Cited

U.S. PATENT DOCUMENTS

2013/0124301 A1*   5/2013   Bachman ........... G06Q 30/0241
                                                            705/14.44
2014/0372468 A1*  12/2014   Collins ............... G06F 16/2457
                                                            707/769
(Continued)

FOREIGN PATENT DOCUMENTS

CN     108229986 A     6/2018
CN     109145245 A     1/2019
(Continued)

OTHER PUBLICATIONS

International Search Report issued in International Patent Application No. PCT/CN2021/080634 on May 6, 2021.
(Continued)

*Primary Examiner* — Tae K Kim
(74) *Attorney, Agent, or Firm* — Astute IP Law Group

(57) ABSTRACT

Provided are a method and an apparatus for generating prediction information, an electronic device, and a computer readable medium. The method includes: generating, based on first user characteristic information of a target user, anonymous user information of the target user (201); sending the anonymous user information to a second processing end to enable the second processing end to generate predic-
(Continued)

tion information based on the anonymous user information and second user characteristic information (202) of the target user. Data interaction and sharing are realized while ensuring data privacy, thereby improving accuracy of the prediction information.

13 Claims, 8 Drawing Sheets

(58) Field of Classification Search
CPC ............ G06F 21/6263; G06F 16/9535; G06F 16/9536; G06F 16/35; G06F 16/3347; G06N 20/00
See application file for complete search history.

(56) References Cited

U.S. PATENT DOCUMENTS

| | | | |
|---|---|---|---|
| 2015/0039416 A1* | 2/2015 | Sullivan | G06Q 30/0244 705/14.43 |
| 2015/0278687 A1* | 10/2015 | Sculley, II | G06Q 30/0255 706/47 |
| 2017/0316343 A1 | 11/2017 | Shamsi et al. | |
| 2018/0075493 A1* | 3/2018 | Agarwal | H04L 67/55 |
| 2018/0225709 A1* | 8/2018 | Ferber | G06N 20/00 |
| 2018/0279004 A1* | 9/2018 | Takahashi | H04N 21/4668 |
| 2018/0330398 A1* | 11/2018 | Nesamoney | G06N 3/08 |
| 2019/0034591 A1* | 1/2019 | Mossin | G16H 50/70 |
| 2019/0102698 A1* | 4/2019 | Roberts | G06F 21/606 |
| 2019/0122256 A1* | 4/2019 | Lucash | G06Q 30/0246 |
| 2019/0370017 A1* | 12/2019 | Ruffenach | H04W 4/50 |
| 2019/0373070 A1* | 12/2019 | Ramachandran | G06F 11/3447 |
| 2019/0373071 A1* | 12/2019 | Ramachandran | H04L 67/306 |
| 2021/0042357 A1* | 2/2021 | Wang | G06F 16/9574 |
| 2021/0042787 A1* | 2/2021 | Kleber | H04L 9/085 |
| 2021/0287118 A1* | 9/2021 | Pierce | G06N 5/04 |
| 2022/0391947 A1* | 12/2022 | Kleber | G06Q 30/0255 |

FOREIGN PATENT DOCUMENTS

| | | |
|---|---|---|
| CN | 109522483 A | 3/2019 |
| CN | 109784959 A | 5/2019 |
| CN | 109902446 A | 6/2019 |
| CN | 110910257 A | 3/2020 |
| CN | 111475392 A | 7/2020 |
| JP | 2015069532 A | 4/2015 |
| JP | 2018181326 A | 11/2018 |
| WO | 2019178155 A1 | 9/2019 |

OTHER PUBLICATIONS

Chinese First Office Action issued in corresponding Chinese Application No. 202010270721.X.
Chinese Second Office Action issued in corresponding Chinese Application No. 202010270721.X.
Chinese Notice of Allowance issued in corresponding Chinese Application No. 202010270721.X.
Extended European Search Report in EP21784858.9, mailed Jun. 2, 2023, 10 pages.
Ullah et al., "Privacy in targeted advertising: A survey," arXiv, Cornell University Library, Nov. 4, 2020, 25 pages.
Notice of Allowance issued in Japanese Application No. 2022-547786, mailed Jan. 30, 2024.

* cited by examiner

METHOD AND APPARATUS FOR GENERATING PREDICTION INFORMATION, ELECTRONIC DEVICE, AND COMPUTER READABLE MEDIUM

CROSS-REFERENCE TO RELATED APPLICATIONS

This disclosure is a continuation of International Application NO. PCT/CN2021/080634, filed on Mar. 12, 2021, which claims priority to Chinese Patent Application No. 202010270721.X, filed on Apr. 8, 2020. The disclosures of the aforementioned applications are hereby incorporated by reference in their entireties.

TECHNICAL FIELD

Embodiments of the present disclosure relate to the field of computer technologies and, in particular, to a method and an apparatus for generating prediction information, an electronic device, and a computer readable medium.

BACKGROUND

With regard to considerations of data security and personal information protection, data isolation and islanding effects are becoming more and more serious. Data cannot be exchanged or shared between different subjects or applications, and a model constructed based on an isolated subject's own data is less effective.

SUMMARY

This section of the present disclosure is used to introduce concepts in a brief form, these concepts will be described in detail in the following section with regard to the description of embodiments. This section of the present disclosure is not intended to identify key features or essential features of a claimed technical solution, nor is it intended to limit the scope of the claimed technical solution.

Embodiments of the present disclosure provide a method and an apparatus for generating prediction information, an electronic device and a computer readable medium, so as to solve the technical problems mentioned in the above background section.

In a first aspect, some embodiments of the present disclosure provide a method for generating prediction information, applied to a first processing end, including: generating, based on first user characteristic information of a target user, anonymous user information of the target user; sending the anonymous user information to a second processing end to enable the second processing end to generate prediction information based on the anonymous user information and second user characteristic information of the target user.

In a second aspect, some embodiments of the present disclosure provide a method for generating prediction information, applied to a second processing end, including: receiving, from a first processing end, anonymous user information of a target user, where the anonymous user information is generated by the first processing end based on first user characteristic information of the target user; generating, based on the anonymous user information and second user characteristic information of the target user, prediction information.

In a third aspect, some embodiments of the present disclosure provide a method for generating a first prediction sub-model and a second prediction sub-model, including: inputting a first sample in a first sample set into a first prediction sub-network to obtain sample anonymous user information, where the first sample in the first sample set includes first user characteristic information; inputting the sample anonymous user information and second user characteristic information in a second sample corresponding to the first sample in a second sample set into a second prediction sub-network to obtain actual prediction information, where the second sample in the second sample set includes the second user characteristic information and sample prediction information; obtaining a loss value based on the actual prediction information and the sample prediction information in the second sample corresponding to the first sample in the second sample set; optimizing the second prediction sub-network based on the loss value, and obtaining an intermediate gradient value; optimizing the first prediction sub-network based on the intermediate gradient value; in response to satisfying a training end condition, determining the optimized first prediction sub-network as the first prediction sub-model, and determining the optimized second prediction sub-network as the second prediction sub-model.

In a fourth aspect, some embodiments of the present disclosure provide a system for generating prediction information, including: a first processing end, configured to generate, based on first user characteristic information of a target user, anonymous user information of the target user, and send the anonymous user information to a second processing end; the second processing end, configured to generate prediction information based on the anonymous user information and second user characteristic information of the target user.

In a fifth aspect, some embodiments of the present disclosure provide an apparatus for generating prediction information, including: a first generating unit, configured to generate, based on first user characteristic information of a target user, anonymous user information of the target user; a sending unit, configured to send the anonymous user information to a second processing end to enable the second processing end to generate prediction information based on the anonymous user information and second user characteristic information of the target user.

In a sixth aspect, some embodiments of the present disclosure provide an apparatus for generating prediction information, including: a receiving unit, configured to receive anonymous user information of a target user from a first processing end, where the anonymous user information is generated by the first processing end based on first user characteristic information of the target user; a second generating unit, configured to generate, based on the anonymous user information and second user characteristic information of the target user, prediction information.

In a seventh aspect, some embodiments of the present disclosure provide an electronic device, including: one or more processors; a storage apparatus, having one or more programs stored thereon, where when the one or more programs are executed by the one or more processors, the one or more processors implement any one of the above methods.

In an eighth aspect, some embodiments of the present disclosure provide a computer readable medium, having a program stored thereon, where when the program is executed by a processor, any one of the above methods is implemented.

In a ninth aspect, some embodiments of the present disclosure provide a computer program product, including:

a program, where when the program is executed by a processor, any one of the above methods is implemented.

In a tenth aspect, some embodiments of the present disclosure provide a program, where when the program is executed by a processor, any one of the above methods is implemented.

BRIEF DESCRIPTION OF DRAWINGS

The above and other features, advantages, and aspects of the embodiments of the present disclosure will become more apparent in conjunction with the accompanying drawings and with reference to the following specific implementations. Throughout the accompanying drawings, the same or similar reference signs indicate the same or similar elements. It should be understood that the accompanying drawings are schematic and the originals and elements are not necessarily drawn to scale.

DESCRIPTION OF EMBODIMENTS

Figure 1:
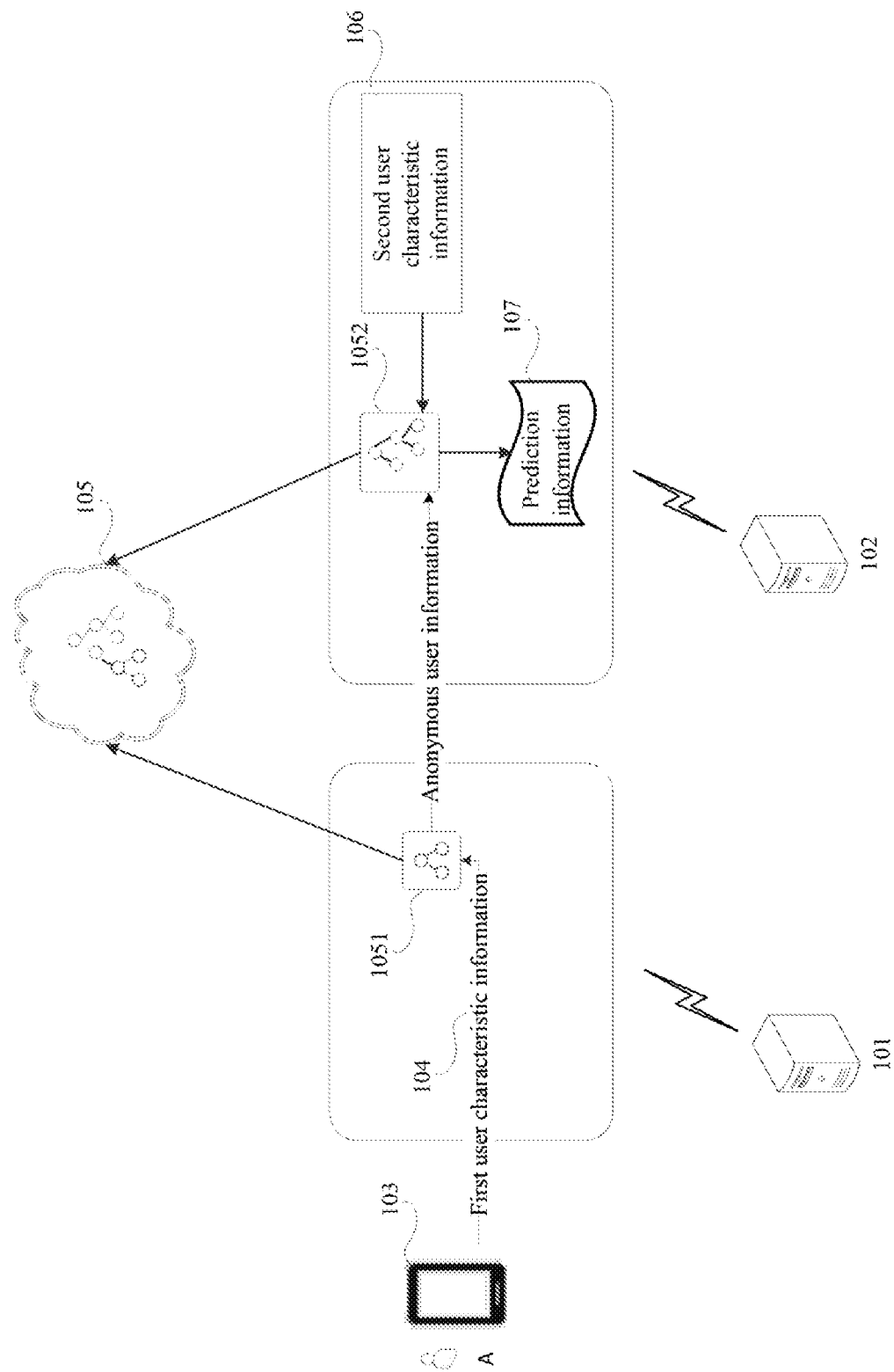
FIG. 1 is a schematic diagram of an exemplary application scenario of a method for generating prediction information according to some embodiments of the present disclosure.

Embodiments of the present disclosure will be described in more detail below with reference to the drawings. Although some embodiments of the present disclosure are shown in the drawings, it should be understood that the present disclosure can be implemented in various forms and should not be explained as being limited to the embodiments set forth herein. On the contrary, these embodiments are provided for a more thorough and complete understanding of the present disclosure. It should be understood that the drawings and embodiments of the present disclosure are merely used for exemplary purposes, and are not used to limit the protection scope of the present disclosure.

In addition, it should be noted that, for the convenience of description, only the parts related to the relevant disclosure are shown in the drawings. In a case of no conflict, the embodiments in the present disclosure and the features in the embodiments can be combined with each other.

It should be noted that the concepts such as "first" and "second" mentioned in the present disclosure are merely used to distinguish different apparatuses, modules or units, and are not used to limit the order or interdependence of functions performed by these apparatuses, modules or units.

It should be noted that the "singular" or "plural" modifications mentioned in the present disclosure are illustrative and not restrictive, and those skilled in the art should understand that unless indicated in the context clearly, otherwise, they should be understood as "one or more".

The names of messages or information exchanged between multiple devices in the embodiments of the present disclosure are only used for illustrative purposes, and are not used to limit the scope of these messages or information.

The present disclosure will be described hereunder in detail with reference to the drawings and in conjunction with the embodiments.

FIG. 1 is a schematic diagram of an application scenario of a method for generating prediction information according to some embodiments of the present disclosure.

The method for generating the prediction information provided in some embodiments of the present disclosure is generally executed by a service side. It should be noted that the service side may be hardware or software. When the service side is the hardware, it may be a server that provides various services, and it may be implemented as a distributed device cluster composed of multiple electronic devices or implemented as a single electronic device. When the service side is the software, it may be installed in the above electronic devices. It may be implemented as, for example, multiple pieces of software or multiple software modules for providing distributed services, or implemented as a single piece of software or a software module. There are no specific limitations here.

As shown in FIG. 1, the execution subject of the method for generating the prediction information may be a first processing end 101 or a second processing end 102. An example is taken where the first processing end 101 is a video server (a backend server of video recommendation applications) and the second processing end 102 is an e-commerce server (a backend server of e-commerce applications). As an example, a user A may communicate with the first processing end 101 through a smart phone 103 installed with video recommendation applications. At this time, a target user may be the user A.

On this basis, for a case where the execution subject is the first processing end 101, the first processing end 101 may generate anonymous user information of the user A based on first user characteristic information 104 of the user A. As an example, the first user characteristic information may be the user A's characteristic information stored in the first processing end, including but not limited to: an age, a gender, a region, a preferred video type, and the like. As an example, the first processing end 101 may input the first user characteristic information 104 of the user A into a first prediction sub-model 1051 to obtain the anonymous user information.

On this basis, the first processing end 101 may send the anonymous user information to the second processing end 102, to enable the second processing end 102 to generate prediction information 107 based on the anonymous user information and second user characteristic information 106 of the user A. As an example, the second processing end 102 may input the anonymous user information and the second user characteristic information 106 of the user A into a second prediction sub-model 1052 to generate the prediction information 107.

For a case where the execution subject is the second processing end 102, the second processing end 102 may receive the anonymous user information of the user A from the first processing end 101, where the anonymous user information is generated by the first processing end 101 based on the first user characteristic information 104 of the user A. As a result, the second processing end 102 may generate the prediction information 107 based on the anonymous user information and the second user characteristic information 106 of the user A. In practice, the prediction information 107 varies with different specific scenarios. As an example, the prediction information 107 may be a predictive click-through rate of an item to be displayed. A first prediction sub-model 1051 and a second prediction sub-model 1052 constitute a prediction model 105.

It should be understood that the first processing end and the second processing end in FIG. 1 are merely illustrative in number. There may be any non-zero number of first processing ends and second processing ends according to implementation needs.

Figure 2:
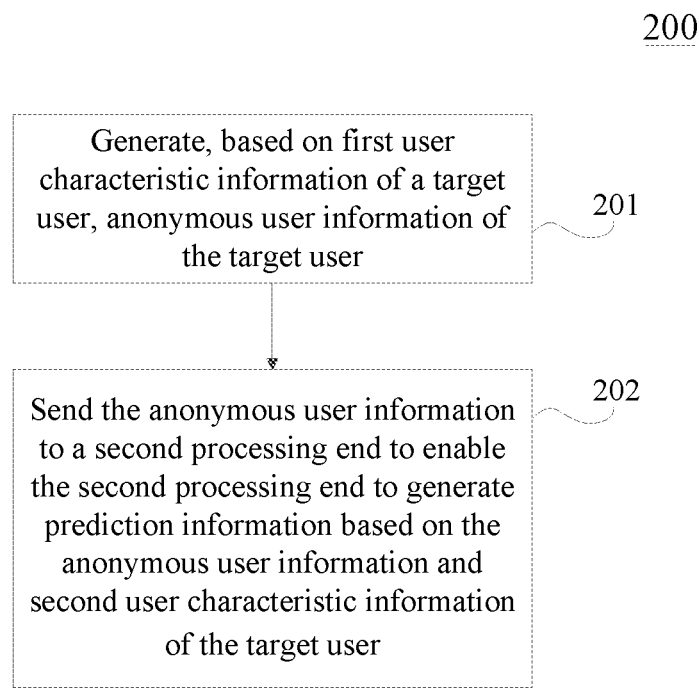
FIG. 2 is a flowchart of some embodiments of a method for generating prediction information according to the present disclosure.

With continued reference to FIG. 2, a flow 200 of some embodiments of a method for generating prediction information according to the present disclosure is shown. The method for generating the prediction information is applied to a first processing end, and includes the following steps.

Step 201, generate, based on first user characteristic information of a target user, anonymous user information of the target user.

In some embodiments, the execution subject for generating the prediction information as described above may be the first processing end. In practice, the first processing end may be various types of processing ends. For example, it may be a video server (a backend server for video recommendation applications) shown in FIG. 1. As a result, a user may communicate with the first processing end through a terminal. As an example, the user may watch a video through a video streaming application installed on the terminal (for example, a smart phone). Of course, according to needs, the first processing end may also be an e-commerce server (a backend server of e-commerce applications) shown in FIG. 1, which is not limited in the present disclosure.

In some embodiments, the first processing end may generate, based on first user characteristic information of a target user, anonymous user information of the target user, where the target user may be any user. In practice, the target user may be determined by designation or by filtering through certain conditions. For example, a user who currently communicates with the first processing end through a terminal may be determined as the target user. Specifically, for example, the first processing end may input the first user characteristic information of the target user into a first prediction sub-model to obtain the anonymous user information of the target user. In the first prediction sub-model, the first user characteristic information may include one or more pieces of characteristic information of the target user, including but not limited to: an age, a gender, a region, a preferred video type, and the like. In practice, the first user characteristic information of the target user may be obtained through various ways. For example, relevant characteristic information may be obtained in advance from the user's historical browsing information (video or graphics, etc.) or the user's login information. For another example, the characteristic information such as a region where the user is located may also be determined through a network that the user accesses.

In some embodiments, the anonymous user information may be generated through the user characteristic information, but generally the user characteristic information cannot be deciphered through the anonymous user information, thereby ensuring security of data (especially the user characteristic information) during a transmission process. In practice, the anonymous user information may be information in various forms. As an example, the anonymous user information may be mapping of the user characteristic information in another vector space. As an example, the anonymous user information may be information obtained after processing such as compression and splicing, on a basis of the mapping.

In some optional implementations of some embodiments, the generating, based on the first user characteristic information of the target user, the anonymous user information of the target user includes: inputting the first user characteristic information into a first prediction sub-model to obtain a first user characteristic embedding vector; splicing the first user characteristic embedding vector and a context vector to obtain a splicing vector; multiplying the splicing vector and a parameter matrix of the first prediction sub-model to obtain the anonymous user information of the target user. In these implementations, encryption of the first user characteristic information is achieved by splicing and matrix multiplication. In addition, since the context vector is added, information richness of the anonymous user information is increased.

In some optional implementations of some embodiments, the multiplying the splicing vector and the parameter matrix of the first prediction sub-model to obtain the anonymous user information of the target user includes: multiplying the splicing vector and the parameter matrix of the first prediction sub-model to obtain a multiplication vector; performing data compression on the multiplication vector to obtain the anonymous user information of the target user.

In these implementations, as an example, a quantization technology in digital signal processing may be used to compress the multiplication vector, so as to obtain the anonymous user information of the target user. In practice, according to actual needs, a 1-bit quantization or b-bit quantization manner may be used to compress the multiplication vector. Specifically, by using 1-bit Quantization, a value of each dimension in the multiplication vector may be assigned as a minimum value or a maximum value in the multiplication vector according to a certain probability, thereby obtaining the anonymous user information. At this time, the anonymous user information only contains the minimum value and the maximum value, and original information is greatly compressed to ensure data encryption. In addition, in order to avoid excessive loss of information, the b-bit Quantization manner may also be used to compress the multiplication vector. Specifically, a value of each dimension in the multiplication vector may be assigned as one of 2*b values according to a certain probability, where a value of b may be configured according to actual needs. In this way, excessive loss of information is avoided while ensuring the anonymity of information.

In some optional implementations of some embodiments, the generating, based on the first user characteristic information of the target user, the anonymous user information of the target user includes: obtaining, based on the first user characteristic information of the target user and object characteristic information of an object to be displayed, the anonymous user information of the target user.

In these implementations, the objects to be displayed may be objects in various forms. For example, they may be various physical or virtual items (clothing, food, etc.) to be displayed on an e-commerce platform. For another example, they may also be various types of information (videos, images, texts and a combination thereof, etc.) to be displayed on an information platform. Obtaining the anonymous user information based on the first user characteristic information and the object characteristic information of the object to be displayed enables fusion, in the obtained anonymous user information, of the first user characteristic information and the object characteristic information of the object to be displayed. The object characteristic information may be fully utilized, and applicable scenarios are increased.

Step 202, send the anonymous user information to a second processing end to enable the second processing end to generate prediction information based on the anonymous user information and second user characteristic information of the target user.

In some embodiments, the above-mentioned execution subject may send the anonymous user information to the second processing end through various ways. On this basis, the second processing end may generate through various ways, based on the anonymous user information and the second user characteristic information of the target user, the prediction information. As an example, the anonymous user information and the second user characteristic information of the target user may be input into a second prediction sub-model to obtain the prediction information. The prediction information may be various types of information according to implementation needs. As an example, the prediction information may be a click-through rate, the number of impressions, a conversion rate, and the like.

In some embodiments, the first prediction sub-model and the second prediction sub-model constitute a prediction model. The first prediction sub-model may be arranged at the first processing end, and the second prediction sub-model may be arranged at the second processing end. That is to say, the prediction model may be divided according to actual needs to obtain the first prediction sub-model and the second prediction sub-model. On this basis, the two sub-models are respectively arranged at different processing ends. The prediction model may be various artificial neural networks trained to predict information.

In some optional implementations of some embodiments, the first prediction sub-model and the second prediction sub-model included in the prediction model are obtained by training based on a first sample set and a second sample set, a first sample in the first sample set includes the first user characteristic information, and a second sample in the second sample set includes the second user characteristic information and sample prediction information.

In these optional implementations, the first sample set may be stored in the first processing end, and the second sample set may be stored in the second processing end. Generally, samples in the first sample set and the second sample set may be aligned by a certain identifier. That is to say, for a certain sample in the first sample set, the second sample set generally has a sample corresponding to that sample.

In these implementations, as an example, the prediction model is obtained by training through the following steps. It can be understood that these implementations may also be used as exemplary implementations of a method for generating a first prediction sub-model and a second prediction sub-model. Specifically included are the following steps.

Step 1, inputting the first sample in the first sample set into a first prediction sub-network to obtain sample anonymous user information, where the first sample in the first sample set includes the first user characteristic information.

Step 2, inputting the sample anonymous user information and the second user characteristic information in the second sample corresponding to the first sample in the second sample set into a second prediction sub-network to obtain actual prediction information, where the second sample in the second sample set includes the second user characteristic information and sample prediction information.

Step 3, obtaining a loss value based on the actual prediction information and the sample prediction information in the second sample corresponding to the first sample in the second sample set. For example, a difference between the actual prediction information and the sample prediction information in the second sample may be calculated based on a preset loss function to obtain the loss value.

Step 4, optimizing the second prediction sub-network based on the loss value, and obtaining an intermediate gradient value. In practice, as an example, the loss value may be propagated forward from an output layer of the second prediction sub-network by means of back propagation, stochastic gradient descent, etc., so as to optimize the second prediction sub-network. In addition, a gradient value of an input layer of the second prediction sub-network, that is, the intermediate gradient value, may also be obtained.

Step 5, optimizing the first prediction sub-network based on the intermediate gradient value. Specifically, the intermediate gradient value may be propagated forward from the output layer of the first prediction sub-network by means of back propagation, stochastic gradient descent, etc., so as to optimize the first prediction sub-network.

Step 6, in response to satisfying a training end condition, determining the optimized first prediction sub-network as the first prediction sub-model, and determining the optimized second prediction sub-network as the second prediction sub-model. Optionally, if the training end condition is not satisfied, the execution of training steps may proceed for the optimized first prediction sub-network and the optimized second prediction sub-network. In practice, the training end condition may be that a certain number of iterations are reached, the loss value is less than a preset threshold, or the like.

In these implementations, the first prediction sub-network and the second prediction sub-network may be of various artificial neural network structures. Different network structures may be selected according to actual needs.

In practice, the first user characteristic information and the second user characteristic information may or may not include the same characteristic information, which is not limited in the present disclosure. It can be understood that the first user characteristic information and the second user characteristic information may generally be stored on different processing sides.

The method according to some embodiments of the present disclosure allows for, generating anonymous user information based on first user characteristic information, and then generating prediction information. In practice, according to needs, the first user characteristic information may be data of a first processing end, and second user characteristic information may be data of a second processing end. That is to say, the first processing end and the second processing end may respectively use their own data to realize data interaction and sharing. Comparing with usage of data of only one end, accuracy of the prediction information is improved. In this process, the first processing end and the second processing end transfer information through the anonymous user information, thereby ensuring data security.

Figure 3:
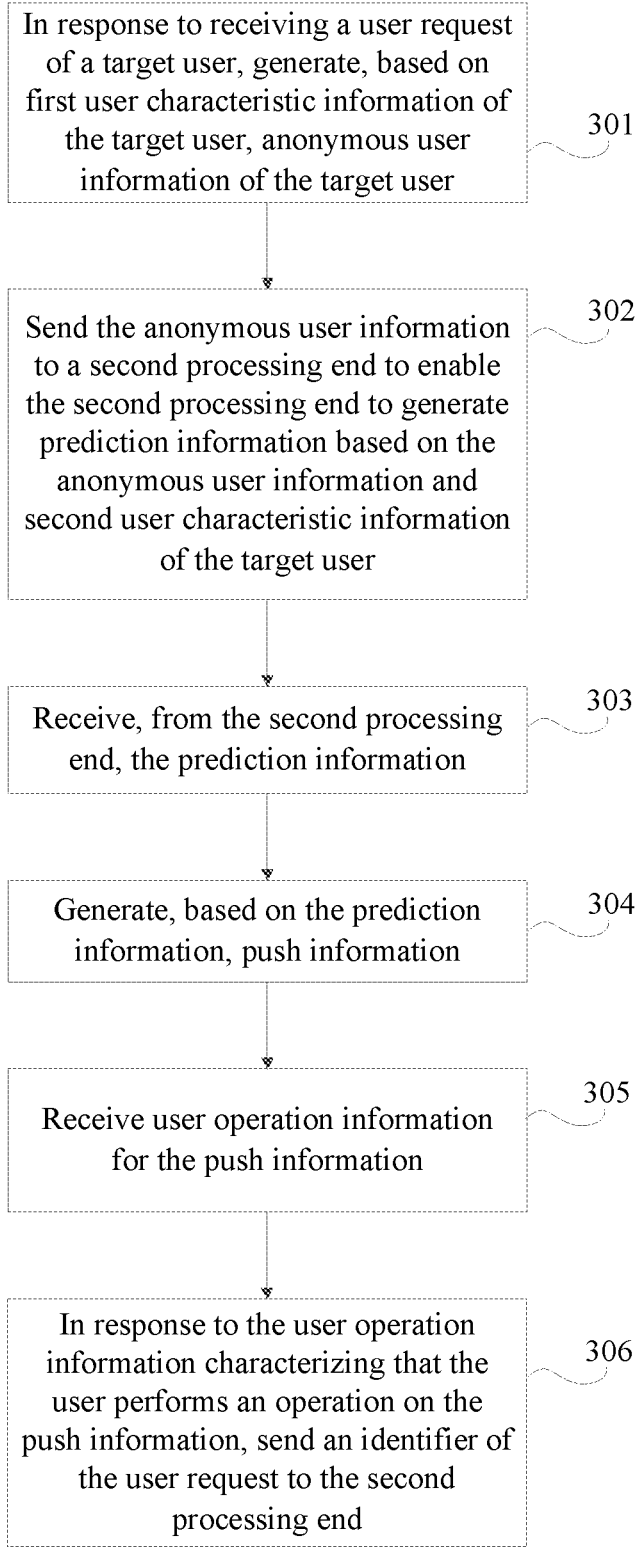
FIG. 3 is a flowchart of other embodiments of a method for generating prediction information according to the present disclosure.

With further reference to FIG. 3, a flow 300 of still other embodiments of a method for generating prediction information is shown. The method for generating the prediction information, applied to a first processing end, includes the following steps.

Step 301, in response to receiving a user request of a target user, generate, based on first user characteristic information of the target user, anonymous user information of the target user.

In some embodiments, the execution subject of the method for generating the prediction information may generate the anonymous user information of the target user based on the first user characteristic information of the target user in response to receiving the user request of the target user, which clarifies the timing of executing the method.

Step 302, send the anonymous user information to a second processing end to enable the second processing end to generate prediction information based on the anonymous user information and second user characteristic information of the target user.

In some embodiments, for a specific implementation of step 302 and a technical effect it brings, reference may be made to step 202 in those embodiments corresponding to FIG. 2, which will not be repeated here.

Step 303, receive, from the second processing end, the prediction information.

Step 304, generate, based on the prediction information, push information.

In some embodiments, the execution subject may generate the push information based on the prediction information. Specifically, different manners may be used to generate the push information according to different pieces of prediction information. As an example, if the prediction information is a click-through rate, a piece of candidate information with a click-through rate greater than a preset threshold may be selected from pieces of candidate information as the push information. Optionally, according to needs, the push information may be sent to a terminal to display the push information.

Step 305, receive user operation information for the push information.

In some embodiments, the user may perform a certain operation on the push information. According to needs, the user may perform different operations. For example, when the push information is an informative message (such as news), the user may perform operations, such as browsing, collecting, sharing, and the like. Of course, the user may also directly close the push information without performing an operation on the push information. Therefore, the user operation information may be used to characterize whether the user performs an operation, a type of the operation performed, and the like.

Step 306, in response to the user operation information characterizing that the user performs an operation on the push information, send an identifier of the user request to the second processing end.

In some embodiments, in response to the user operation information characterizing that the user performs the operation on the push information, the execution subject may send the identifier of the user request to the second processing end.

In some optional implementations of some embodiments, in response to receiving user behavior information, associating and storing the identifier of the user request and the user behavior information.

In these optional implementations, the user behavior information is used to characterize a behavior executed by the user for a jumping page, the jumping page is a page that the user jumps to after executing an operation on the push information. In practice, as an example, the push information may be product information. After the user executes a certain operation (such as clicking) on the product information, the first processing end or the second processing end may display the corresponding jumping page. As an example, the jumping page may be a product purchase page. The user may execute actions such as buying, collecting, sharing, adding to cart, etc. on the product purchase page. In practice, the jumping page corresponding to the product information may be preset.

It can be seen from FIG. 3 that the step of generating the push information is added compared with the description of some embodiments corresponding to FIG. 2. Since accuracy of the prediction information is improved, the push information is more targeted. In addition, storing the user operation information, the user behavior information, etc. may enrich data of the first processing end and the second processing end, which provides a basis for further optimization of a prediction model. In this process, sample alignment is achieved through the identifier of the user request, which facilitates further optimization of the model.

Figure 4:
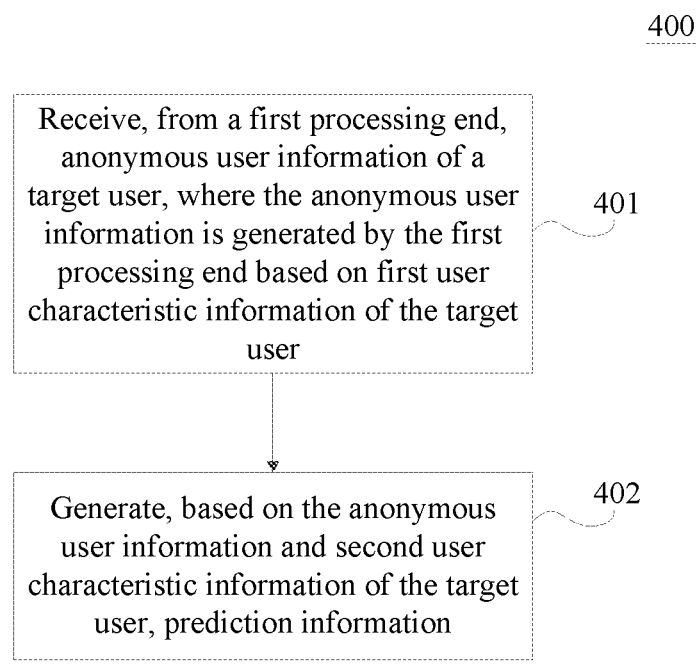
FIG. 4 is a flowchart of still other embodiments of a method for generating prediction information according to the present disclosure.

With further reference to FIG. 4, a flow 400 of still other embodiments of a method for generating prediction information is shown. The flow 400 of the method for generating the prediction information, which is applied to a second processing end, includes the following steps.

Step 401, receive, from a first processing end, anonymous user information of a target user, where the anonymous user information is generated by the first processing end based on first user characteristic information of the target user.

In some embodiments, the execution subject for generating the prediction information as described above may be the second processing end. In practice, the second processing end may be various types of processing ends. The second processing end may receive the anonymous user information of the target user from the first processing end. The anonymous user information is generated by the first processing end based on the first user characteristic information of the target user and a first prediction sub-model. Specifically, for the method of generating the anonymous user information, reference may be made to those embodiments corresponding to FIG. 2, which will not be repeated here.

Step 402, generate, based on the anonymous user information and second user characteristic information of the target user, prediction information.

In some embodiments, the second processing end may generate through various ways, based on the anonymous user information and the second user characteristic information of the target user, the prediction information. As an example, the anonymous user information and the second user characteristic information of the target user may be input into a second prediction sub-model to obtain the prediction information. The prediction information may be varieties of information according to implementation needs. As an example, the prediction information may be a click-through rate, the number of impressions, a conversion rate, and the like. For specific implementations of the first prediction sub-model and the second prediction sub-model, reference may be made to the embodiments corresponding to FIG. 2, which will not be repeated here.

In optional implementations of some embodiments, the above method may further include: generating, based on the prediction information, push information.

In optional implementations of some embodiments, the above method may further include: receiving user operation information for the push information; in response to the user operation information characterizing that the user performs an operation on the push information, sending an identifier of the user request to the first processing end.

In optional implementations of some embodiments, the above method may further include: associating and storing the identifier of the user request, the push information and the user operation information.

In optional implementations of some embodiments, the above method may further include: in response to receiving user behavior information, associating and storing the identifier of the user request and the user behavior information, where the user behavior information is used to characterize a behavior executed by the user for a jumping page, the jumping page is a page that the user jumps to after performing an operation on the push information.

In some embodiments, receive the anonymous user information of the target user from the first processing end, and then generate the prediction information based on the anonymous user information and the second user characteristic information of the target user. In this process, since the anonymous user information is generated by the first processing end based on the first user characteristic information of the target user, thereby multi-party data is used while ensuring security of data, to realize interaction and sharing of data, and then accuracy of prediction information is improved.

Figure 5:
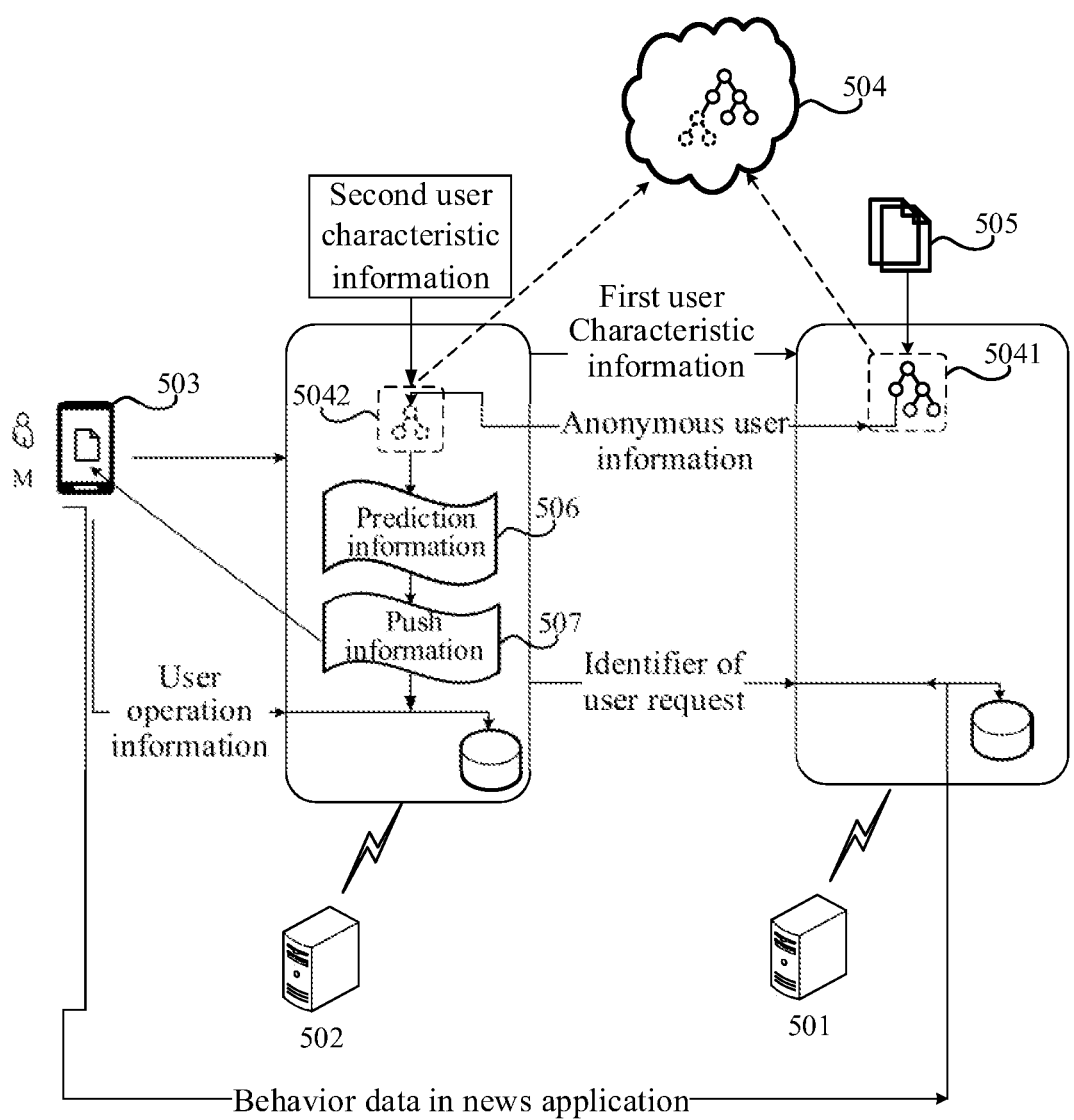
FIG. 5 is a schematic diagram of another application scenario of a method for generating prediction information according to some embodiments of the present disclosure.
Figure 6:
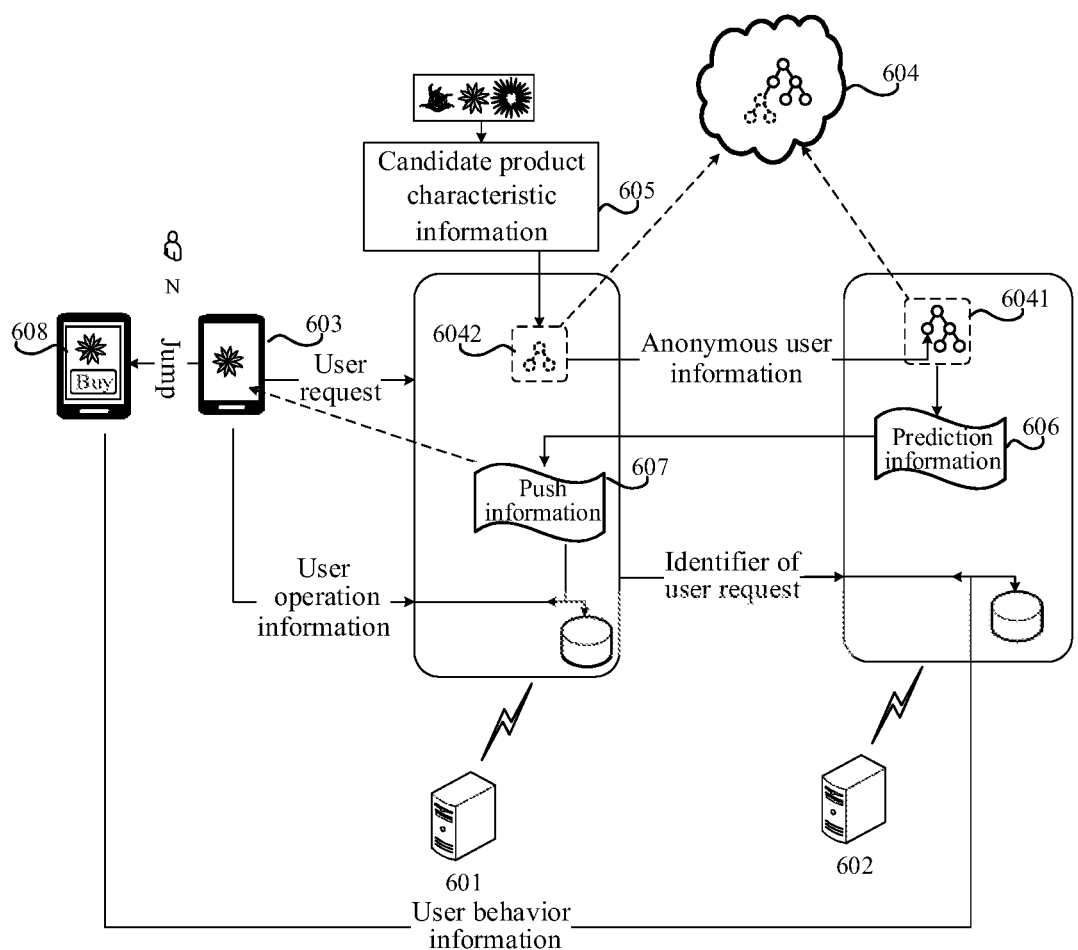
FIG. 6 is a schematic diagram of a still another application scenario of a method for generating prediction information according to some embodiments of the present disclosure.

With further reference to FIG. 5 and FIG. 6, schematic diagrams of two application scenarios of the method for generating the prediction information according to some embodiments of the present disclosure are shown.

In the application scenario shown in FIG. 5, the first processing end is an information server 501 (for example, a backend server for news applications), the second processing end is a video server 502 (a backend server for video recommendation applications). A user M may communicate with the video server 502 through a smart phone 503 installed with the video recommendation applications. At the same time, the smart phone 503 may also be installed with information applications. Thereby the user M may also communicate with the information server 501 through the smart phone 503. In this process, a target user may be the user M.

On this basis, as an example, the second processing end may convert characteristic information of the target user on the second processing end side into a characteristic vector. On this basis, the characteristic vector may be sent to the first processing end as first user characteristic information. Thereby the first processing end may input the first user characteristic information and candidate article characteristic information 505 into a first prediction sub-model 5041 to obtain anonymous user information of the target user. On this basis, the first processing end 501 sends the anonymous user information to the second processing end 502.

Thereby the second processing end 502 may receive the anonymous user information. On this basis, the anonymous user information and the second user characteristic information of the user M may be input into a second prediction sub-model 5042 to generate prediction information 506. In this application scenario, the prediction information 506 is a click-through rate of the user for a candidate article. On this basis, the second processing end generates push information 507 based on the prediction information 506. In this application scenario, the push information 507 may be a push article selected according to the click-through rate. And the push article may be pushed to the smart phone 503. In practice, for the push article, the user M may view it by clicking or other operations.

On this basis, the smart phone 503 may send user operation information to the second processing end 502. Therefore, the second processing end 502 may receive the user operation information for the push information. In response to the user operation information characterizing that the user performs an operation on the push information, the second processing end 502 may send an identifier of the user request to the first processing end 501. In addition, the second processing end 502 may associate and store the identifier of the user request, the push information 507 and the user operation information.

Optionally, in practice, the user might only perform some simple operations for a push article in a video recommendation application, for more operations, the user needs to jump to a news application for execution. On this basis, the first processing end 501 may associate and store the identifier of the user request and behavior data of the user in the news application.

With continued reference to FIG. 6, in the application scenario shown in FIG. 6, the first processing end is a video server 601 (a backend server of video recommendation applications), and the second processing end is an e-commerce server 602 (for example, a backend of e-commerce applications). A user N may communicate with the video server 601 through a smart phone 603 installed with a video recommendation application. Similarly, the smart phone 603 may also be installed with e-commerce applications. The user N may communicate with the e-commerce server 602 through the smart phone 603. In this process, a target user may be the user N.

On this basis, the video server 601 may input first user characteristic information of the user N and candidate product characteristic information 605 into a first prediction sub-model 6042 to generate anonymous user information of the user N. In practice, as an example, the candidate product characteristic information 605 may be obtained in advance. On this basis, the video server 601 may send the anonymous user information to the e-commerce server 602.

Thereby the e-commerce server 602 may receive the anonymous user information. On this basis, the anonymous user information and second user characteristic information of the user N are input into a second prediction sub-model 6041 to generate prediction information 606. In this application scenario, the prediction information 606 may be a click-through rate for displayed product information.

On this basis, the e-commerce server 602 may send the prediction information 606 to the video server 601. Thereby the video server 601 may select product information, that corresponds to the candidate product characteristic information with the click-through rate greater than a preset threshold, as push information 607. After that, similar to the application scenario corresponding to FIG. 5, the video server 601 may receive user operation information for the push information 607. In response to the user operation information characterizing that the user performs an operation on the push information, the video server 601 may send an identifier of the user request to the e-commerce server 602. The video server 601 may associate and store the identifier of the user request, the push information 607 and the user operation information. Further, for the push information 607, the user may enter a jumping page 608 by clicking or other operations. As an example, the jumping page may be a related page in e-commerce applications. The user may perform various behaviors such as buying, collecting, and sharing, etc. on the jumping page 608. In response to receiving user behavior information, the e-commerce server 602 may store the identifier of the user request and the user behavior information.

Figure 7:
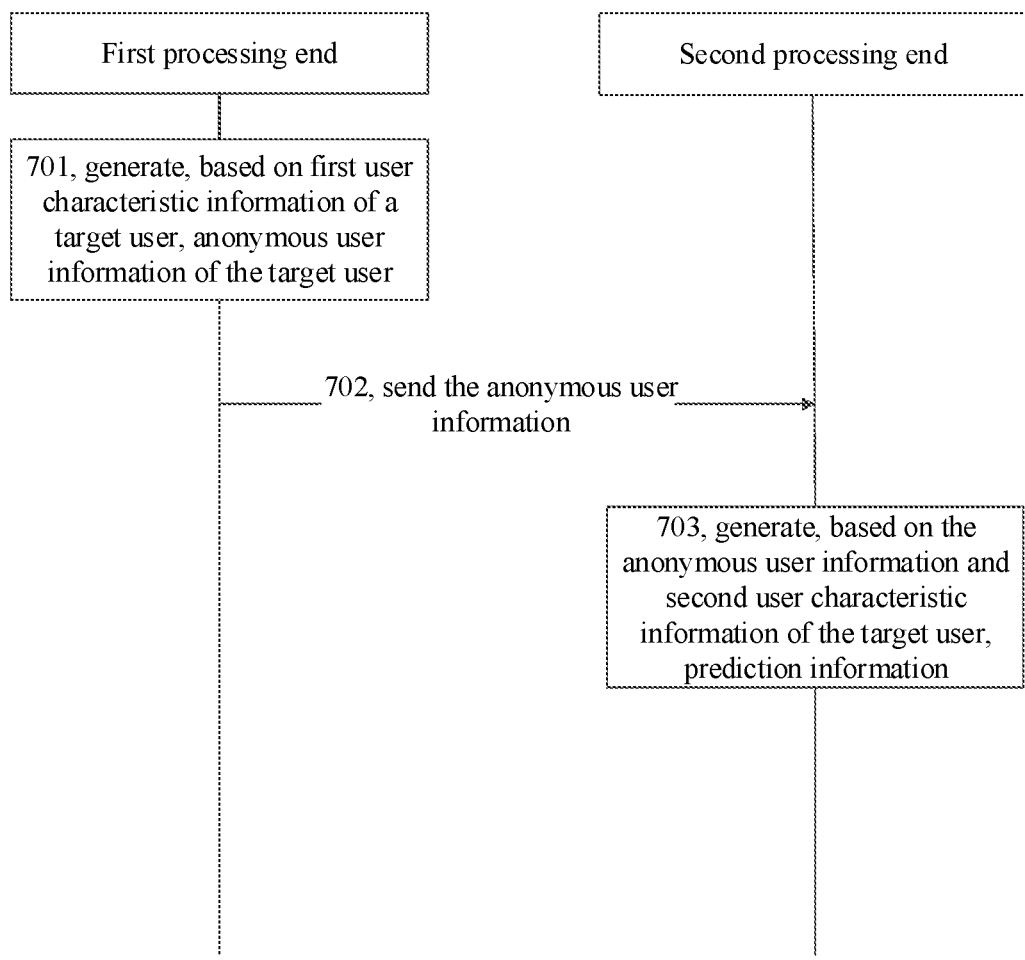
FIG. 7 is an exemplary sequence diagram of a system for generating prediction information according to some embodiments of the present disclosure.

With further reference to FIG. 7, an exemplary sequence diagram of a system for generating prediction information according to some embodiments of the present disclosure is shown.

As shown in FIG. 7, the system 700 for generating the prediction information includes a first processing end and a second processing end, so that the first processing end and the second processing end may perform the following steps.

Step 701, the first processing end generates, based on first user characteristic information of a target user, anonymous user information of the target user.

Step 702, the first processing end sends the anonymous user information to the second processing end.

Step 703, the second processing end generates, based on the anonymous user information and second user characteristic information of the target user, prediction information.

In some embodiments, for specific implementations of steps 701-703 and the technical effects they bring, reference may be made to the descriptions in FIG. 2 to FIG. 4, which will not be repeated here.

Figure 8:
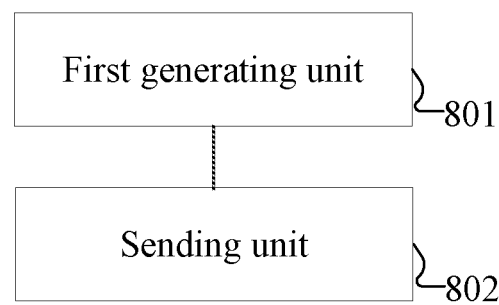
FIG. 8 is a schematic structural diagram of some embodiments of an apparatus for generating prediction information according to the present disclosure.

With further reference to FIG. 8, as implementations of the methods shown in the above figures, the present disclosure provides some embodiments of an apparatus for generating prediction information. These apparatus embodiments correspond to those method embodiments shown in FIG. 2, the apparatus may be specifically applied to various electronic devices.

As shown in FIG. 8, the apparatus 800 for generating the prediction information in some embodiments includes: a first generating unit 801 and a sending unit 802, where the first generating unit 801 is configured to generate anonymous user information of a target user based on first user characteristic information of the target user; the sending unit 802 is configured to send the anonymous user information to a second processing end to enable the second processing end to generate prediction information based on the anonymous user information and second user characteristic information of the target user.

In some embodiments, for specific implementations of the first generating unit 801 and the sending unit 802 in the apparatus 800 as well as the technical effects brought by them, reference may be made to the embodiments corresponding to FIG. 2, which will not be repeated here.

In optional implementations of some embodiments, the first generating unit 801 is further configured to obtain the anonymous user information of the target user based on the first user characteristic information of the target user and object characteristic information of an object to be displayed.

In optional implementations of some embodiments, the apparatus 800 may further include: a prediction information receiving unit (not shown in the figure) and a push information generating unit (not shown in the figure). The prediction information receiving unit is configured to receive the prediction information from the second processing end. The push information generating unit is configured to generate push information based on the prediction information.

In optional implementations of some embodiments, the first generating unit 801 is further configured to: input the first user characteristic information into a first prediction sub-model to obtain a first user characteristic embedding vector; splice the first user characteristic embedding vector and a context vector to obtain a splicing vector; multiply the splicing vector and a parameter matrix of the first prediction sub-model to obtain the anonymous user information of the target user.

In optional implementations of some embodiments, the first generating unit 801 is further configured to: multiply the splicing vector and the parameter matrix of the first prediction sub-model to obtain a multiplication vector; perform data compression on the multiplication vector to obtain the anonymous user information of the target user.

In optional implementations of some embodiments, the first generating unit 801 is further configured to: in response to receiving a user request of the target user, generate the anonymous user information of the target user based on the first user characteristic information of the target user. In optional implementations of some embodiments, the apparatus 800 may further include an operation information receiving unit (not shown in the figure) and an identifier sending unit (not shown in the figure). The operation information receiving unit is configured to receive user operation information for the push information; the identifier sending unit is configured to send an identifier of the user request to the second processing end, in response to the user operation information characterizing that the user performs an operation on the push information.

In some embodiments, generate the anonymous user information based on the first user characteristic information, and then generate the prediction information. In practice, according to needs, the first user characteristic information may be data of the first processing end, the second user characteristic information may be data of the second processing end. That is to say, the first processing end and the second processing end may respectively use their own data to realize data interaction and sharing. Comparing with usage of data of only one end, accuracy of the prediction information is improved. In this process, the first processing end and the second processing end transfer information through the anonymous user information, thereby ensuring data security.

Figure 9:
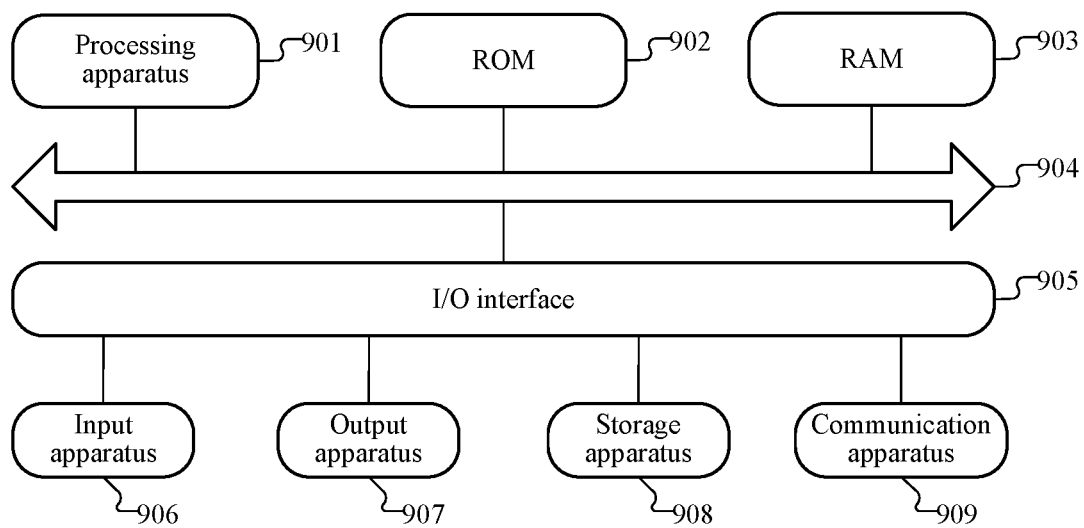
FIG. 9 is a schematic structural diagram of an electronic device suitable for implementing some embodiments of the present disclosure.

Reference may be made hereunder to FIG. 9, which shows a schematic structural diagram of an electronic device 900 suitable for implementing some embodiments of the present disclosure. The electronic device shown in FIG. 9 is only an example, which should not bring any limitation to the functions and the scope of use of the embodiments of the present disclosure.

As shown in FIG. 9, the electronic device 900 may include a processing apparatus (such as a central processing unit, a graphics processor, etc.) 901, which may execute various appropriate actions and processes according to a program stored in a read-only memory (Read-Only Memory, ROM) 902 or a program loaded from a storage apparatus 908 into a random access memory (Random Access Memory, RAM) 903. In the RAM 903, various programs and data required for an operation of the electronic device 900 are also stored. The processing apparatus 901, the ROM 902, and the RAM 903 are connected to each other through a bus 904. An input/output (Input/Output, I/O) interface 905 is also connected to the bus 904.

Generally, the following apparatuses may be connected to the I/O interface 905: an input apparatus 906, including for example, a touch screen, a touch panel, a keyboard, a mouse, a camera, a microphone, an accelerometer, a gyroscope, or the like; an output apparatus 907, including for example a liquid crystal display (Liquid Crystal Display, LCD), a speaker, a vibrator, or the like; the storage apparatus 908, including for example a magnetic tape, a hard disk, or the like; and a communication apparatus 909. The communication apparatus 909 may allow the electronic device 900 to perform wireless or wired communication with other devices to exchange data. Although FIG. 9 shows the electronic device 900 having various apparatuses, it should be understood that it is not required to implement or have all of the shown apparatuses. More or fewer apparatuses may be implemented or provided alternatively. Each block shown in FIG. 9 may represent one apparatus, or may represent multiple apparatuses according to needs.

In particular, according to some embodiments of the present disclosure, the process described above with reference to the flowchart may be implemented as a computer software program. For example, some embodiments of the present disclosure include a computer program product, which includes a computer program carried on a computer readable medium, and the computer program contains program codes for executing the method shown in the flowchart. In some such embodiments, the computer program may be downloaded and installed from a network through the communication apparatus 909, or installed from the storage apparatus 908, or installed from the ROM 902. When the computer program is executed by the processing apparatus 901, the above-mentioned functions defined in the methods of some embodiments of the present disclosure are executed.

It should be noted that the computer readable medium described in some embodiments of the present disclosure may be a computer readable signal medium or a computer readable storage medium, or any combination of both. The computer readable storage medium may be, for example, but not limited to, an electrical, magnetic, optical, electromagnetic, infrared, or semiconductive system, apparatus or device, or any combination of the above. More specific examples of the computer readable storage medium may include, but are not limited to: an electrically connected portable computer disk with one or more wires, a hard disk, a random access memory (RAM), a read-only memory (ROM), an erasable programmable read-only memory (Erasable Programmable ROM, EPROM or flash memory), an optical fiber, a portable compact disc read-only memory (Compact Disc ROM, CD-ROM), an optical storage device, a magnetic storage device, or any suitable combination of the above. In some embodiments of the present disclosure, the computer readable storage medium may be any tangible medium in which a program is contained or stored, and the program may be used by or in combination with an instruction execution system, apparatus, or device. In some embodiments of the present disclosure, the computer readable signal medium may include a data signal propagated in a baseband or as a part of a carrier wave, and computer readable program codes are carried therein. This propagated data signal may adopt many forms, including but not limited to, an electromagnetic signal, an optical signal, or any suitable combination of the above. The computer readable signal medium may also be any computer readable media other than the computer readable storage medium. The computer readable signal medium may send, propagate, or transmit the program used by or in combination with the instruction execution system, apparatus, or device. The program codes contained on the computer readable medium may be transmitted by any suitable medium, including but not limited to: a wire, an optical cable, a RF (radio frequency, Radio Frequency), etc., or any suitable combination of the above.

In some embodiments, a client and a server may communicate using any currently known network protocol such as HTTP (HyperText Transfer Protocol, hypertext transfer protocol) or any network protocols researched and developed in the future, and may interconnect with digital data communications (for example, a communication network) in any form or medium. Examples of the communication network include a local area network (Local Area Network, "LAN"), a wide area network (Wide Area Network, "WAN"), an Internet (for example, Internet) and an end-to-end network (for example, an Ad-hoc network), and any networks currently known or researched and developed in the future.

The above-mentioned computer readable medium may be included in the above-mentioned electronic device; or it may exist alone without being assembled into the electronic device. The above computer readable medium carries one or more programs, when the above one or more programs are executed by the electronic device, the electronic device is enabled to: generate anonymous user information of a target user based on first user characteristic information of the target user; send the anonymous user information to a second processing end to enable the second processing end to generate prediction information based on the anonymous user information and second user characteristic information of the target user.

The computer program codes for performing operations of some embodiments of the present disclosure may be written in one or more programming languages or a combination thereof. The programming languages include object-oriented programming languages—such as Java, Smalltalk, C++, and also include conventional procedural programming language—such as "C" language or similar programming language. The program codes may be executed entirely on a computer of a user, executed partly on a computer of a user, executed as an independent software package, partly executed on a computer of a user and partly executed on a remote computer, or entirely executed on a remote computer or a server. In a case where a remote computer is involved, the remote computer may be connected to the computer of the user through any kind of network—including the local area network (LAN) or the wide area network (WAN), or, it may be connected to an external computer (for example, being connected via the Internet with use of an Internet service provider).

The flowcharts and block diagrams in the accompanying drawings illustrate the architecture, functions, and operations of possible implementations of the system, method, and computer program product according to the embodiments of the present disclosure. In this point, each block in the flowcharts or block diagrams may represent a module, a program segment, or a part of codes, and the module, the program segment, or the part of codes contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in the reverse order, which depends on the functions involved. It should also be noted that, each block in the block diagrams and/or flowcharts, and a combination of the blocks in the block diagrams and/or flowcharts, may be implemented by a dedicated hardware-based system that performs the specified functions or operations, or may be implemented by a combination of dedicated hardware and computer instructions.

The units described in some embodiments of the present disclosure may be implemented in software or hardware. The described units may also be set in a processor, for example, it may be described as: a processor including a first generating unit and a sending unit. The names of these units do not constitute a limitation on the units themselves under certain cases. For example, the first generating unit may also be described as "a unit that generates anonymous user information of a target user".

The functions described above in the context may be performed at least in part by one or more hardware logic components. For example, without limitation, exemplary types of hardware logic components that may be used include: a field programmable gate array (Field Programmable Gate Array, FPGA), an application specific integrated circuit (Application Specific Integrated Circuit, ASIC), application specific standard parts (Application Specific Standard Parts, ASSP), a system on chip (System on Chip, SOC), a complex programming logic device (Complex Programming Logic Device, CPLD), and the like.

According to one or more embodiments of the present disclosure, a method for generating prediction information is provided, including: generating, based on first user characteristic information of a target user, anonymous user information of the target user; sending the anonymous user information to a second processing end to enable the second processing end to generate prediction information based on the anonymous user information and second user characteristic information of the target user.

According to one or more embodiments of the present disclosure, the generating, based on the first user characteristic information of the target user, the anonymous user information of the target user includes: obtaining, based on the first user characteristic information of the target user and object characteristic information of an object to be displayed, the anonymous user information of the target user.

According to one or more embodiments of the present disclosure, the method further includes: receiving, from the second processing end, the prediction information; generating, based on the prediction information, push information.

According to one or more embodiments of the present disclosure, the generating, based on the first user characteristic information of the target user, the anonymous user information of the target user includes: inputting the first user characteristic information into a first prediction sub-model to obtain a first user characteristic embedding vector; splicing the first user characteristic embedding vector and a context vector to obtain a splicing vector; multiplying the splicing vector and a parameter matrix of the first prediction sub-model to obtain the anonymous user information of the target user.

According to one or more embodiments of the present disclosure, the multiplying the splicing vector and the parameter matrix of the first prediction sub-model to obtain the anonymous user information of the target user includes: multiplying the splicing vector and the parameter matrix of the first prediction sub-model to obtain a multiplication vector; performing data compression on the multiplication vector to obtain the anonymous user information of the target user.

According to one or more embodiments of the present disclosure, the generating, based on the first user characteristic information of the target user, the anonymous user information of the target user includes: in response to receiving a user request of the target user, generating, based on the first user characteristic information of the target user, the anonymous user information of the target user.

According to one or more embodiments of the present disclosure, the method further includes: receiving user operation information for the push information; in response to the user operation information characterizing that the user performs an operation on the push information, sending an identifier of the user request to the second processing end.

According to one or more embodiments of the present disclosure, the first prediction sub-model is obtained by training through steps of: inputting a first sample in a first sample set into a first prediction sub-network to obtain sample anonymous user information, where the first sample in the first sample set includes the first user characteristic information; inputting the sample anonymous user information and the second user characteristic information in a second sample corresponding to the first sample in a second sample set into a second prediction sub-network to obtain actual prediction information, where the second sample in the second sample set includes the second user characteristic information and sample prediction information; obtaining a loss value based on the actual prediction information and the sample prediction information in the second sample corresponding to the first sample in the second sample set, optimizing the second prediction sub-network based on the loss value, and obtaining an intermediate gradient value; optimizing the first prediction sub-network based on the intermediate gradient value; in response to satisfying a training end condition, determining the optimized first prediction sub-network as the first prediction sub-model.

According to one or more embodiments of the present disclosure, a method for generating prediction information is provided, applied to a second processing end, including: receiving, from a first processing end, anonymous user information of a target user, where the anonymous user information is generated by the first processing end based on first user characteristic information of the target user; generating, based on the anonymous user information and second user characteristic information of the target user, prediction information.

According to one or more embodiments of the present disclosure, the method further includes: generating, based on the prediction information, push information.

According to one or more embodiments of the present disclosure, the generating, based on the anonymous user information and the second user characteristic information of the target user, the prediction information includes: inputting the anonymous user information and the second user characteristic information of the target user into a second prediction sub-model to generate the prediction information.

According to one or more embodiments of the present disclosure, the method further includes: receiving user operation information for the push information; in response to the user operation information characterizing that the user performs an operation on the push information, sending an identifier of the user request to the first processing end.

According to one or more embodiments of the present disclosure, the method further includes: associating and storing the identifier of the user request, the push information and the user operation information.

According to one or more embodiments of the present disclosure, the method further includes: in response to receiving user behavior information, associating and storing the identifier of the user request and the user behavior information, where the user behavior information is used to characterize a behavior executed by the user for a jumping page, the jumping page is a page that the user jumps to after performing an operation on the push information.

According to one or more embodiments of the present disclosure, a method for generating a first prediction sub-model and a second prediction sub-model is provided, including: inputting a first sample in a first sample set into a first prediction sub-network to obtain sample anonymous user information, where the first sample in the first sample set includes first user characteristic information; inputting the sample anonymous user information and second user characteristic information in a second sample corresponding to the first sample in a second sample set into a second prediction sub-network to obtain actual prediction information, where the second sample in the second sample set includes the second user characteristic information and sample prediction information; obtaining a loss value based on the actual prediction information and the sample prediction information in the second sample corresponding to the first sample in the second sample set; optimizing the second prediction sub-network based on the loss value, and obtaining an intermediate gradient value; optimizing the first prediction sub-network based on the intermediate gradient value; in response to satisfying a training end condition, determining the optimized first prediction sub-network as the first prediction sub-model, and determining the optimized second prediction sub-network as the second prediction sub-model.

According to one or more embodiments of the present disclosure, a system for generating prediction information is provided, including: a first processing end, configured to generate, based on first user characteristic information of a target user, anonymous user information of the target user, and send the anonymous user information to a second processing end; the second processing end, configured to generate prediction information based on the anonymous user information and second user characteristic information of the target user.

According to one or more embodiments of the present disclosure, an apparatus for generating prediction information is provided, including: a first generating unit, configured to generate, based on first user characteristic information of a target user, anonymous user information of the target user; a sending unit, configured to send the anonymous user information to a second processing end to enable the second processing end to generate prediction information based on the anonymous user information and second user characteristic information of the target user.

According to one or more embodiments of the present disclosure, the first generating unit is further configured to obtain, based on the first user characteristic information of the target user and object characteristic information of an object to be displayed, the anonymous user information of the target user.

According to one or more embodiments of the present disclosure, the apparatus may further include: a prediction information receiving unit and a push information generating unit. The prediction information receiving unit is configured to receive, from the second processing end, the prediction information. The push information generating unit is configured to generate, based on the prediction information, push information.

According to one or more embodiments of the present disclosure, the first generating unit is further configured to: input the first user characteristic information into a first prediction sub-model to obtain a first user characteristic embedding vector; splice the first user characteristic embedding vector and a context vector to obtain a splicing vector; multiply the splicing vector and a parameter matrix of the first prediction sub-model to obtain the anonymous user information of the target user.

According to one or more embodiments of the present disclosure, the first generating unit is further configured to: multiply the splicing vector and the parameter matrix of the first prediction sub-model to obtain a multiplication vector; perform data compression on the multiplication vector to obtain the anonymous user information of the target user.

According to one or more embodiments of the present disclosure, the first generating unit is further configured to: in response to receiving a user request of the target user, generate, based on the first user characteristic information of the target user, the anonymous user information of the target user. According to one or more embodiments of the present disclosure, the apparatus may further include an operation information receiving unit and an identifier sending unit. The operation information receiving unit is configured to receive user operation information for the push information; the identifier sending unit is configured to send an identifier of the user request to the second processing end in response to the user operation information characterizing that the user performs an operation on the push information.

According to one or more embodiments of the present disclosure, the first prediction sub-model is obtained by training through steps of: inputting a first sample in a first sample set into a first prediction sub-network to obtain sample anonymous user information, where the first sample in the first sample set includes the first user characteristic information; inputting the sample anonymous user information and the second user characteristic information in a second sample corresponding to the first sample in a second sample set into a second prediction sub-network to obtain actual prediction information, where the second sample in the second sample set includes the second user characteristic information and sample prediction information; obtaining a loss value based on the actual prediction information and the sample prediction information in the second sample corresponding to the first sample in the second sample set; optimizing the second prediction sub-network based on the loss value, and obtaining an intermediate gradient value; optimizing the first prediction sub-network based on the intermediate gradient value; in response to satisfying a training end condition, determining the optimized first prediction sub-network as the first prediction sub-model.

According to one or more embodiments of the present disclosure, an apparatus for generating prediction information is provided, including: a receiving unit, configured to receive anonymous user information of a target user from a first processing end, where the anonymous user information is generated by the first processing end based on first user characteristic information of the target user; a second generating unit, configured to generate, based on the anonymous user information and second user characteristic information of the target user, prediction information.

According to one or more embodiments of the present disclosure, the apparatus may further include: a third generating unit. The third generating unit may be configured to generate, based on the prediction information, push information.

According to one or more embodiments of the present disclosure, the second generating unit is further configured to: input the anonymous user information and the second user characteristic information of the target user into a second prediction sub-model to generate the prediction information.

According to one or more embodiments of the present disclosure, the apparatus may further include: a user operation information receiving unit, configured to receive user operation information for the push information; an identifier sending unit, configured to send an identifier of the user request to the first processing end in response to the user operation information characterizing that the user performs an operation on the push information.

According to one or more embodiments of the present disclosure, the apparatus further includes: an associating and storing unit. The associating and storing unit is configured to associate and store the identifier of the user request, the push information and the user operation information.

According to one or more embodiments of the present disclosure, the associating and storing unit is further configured to: in response to receiving user behavior information, associate and store the identifier of the user request and the user behavior information, where the user behavior information is used to characterize a behavior executed by the user for a jumping page, the jumping page is a page that the user jumps to after performing an operation on the push information.

According to one or more embodiments of the present disclosure, an electronic device is provided, including: one or more processors; a storage apparatus, having one or more programs stored thereon, where when the one or more programs are executed by the one or more processors, the one or more processors implement any one of the above methods.

According to one or more embodiments of the present disclosure, a computer readable medium is provided, having a program stored thereon, where when the program is executed by a processor, any one of the above methods is implemented.

According to one or more embodiments of the present disclosure, a computer program product is provided, including: a program, where when the program is executed by a processor, any one of the above methods is implemented.

According to one or more embodiments of the present disclosure, a program is provided, where when the program is executed by a processor, any one of the above methods is implemented.

The above description only explains some preferred embodiments of the present disclosure and the applied technical principles. Those skilled in the art should understand that the scope of the disclosure involved in the embodiments of the present disclosure is not limited to the technical solution formed by a specific combination of the above technical features. At the same time, it should also cover other technical solutions formed by any combination of the above technical features or their equivalent features without departing from the above-mentioned inventive concept, such as the technical solution formed by a replacement of the above-mentioned features with the technical features disclosed in the embodiments of the present disclosure (but not limited to) having similar functions.

What is claimed is:

1. A method for transferring information, applied to a first backend server for a first application, comprising:
   generating, by a processor of the first backend server for the first application based on first user characteristic information of a target user, anonymous user information of the target user;
   sending, by the processor of the first backend server for the first application, the anonymous user information to a second backend server for a second application to enable a processor of the second backend server for the second application to generate prediction information based on the anonymous user information and second user characteristic information of the target user; wherein the first user characteristic information comprises information obtained from historical browsing information of the target user and login information of the target user on the first application, and a region where the target user is located, the second user characteristic information comprises the information obtained from the historical browsing information of the target user and the login information of the target user on the second application, and the region where the target user is located;
   receiving, by the processor of the first backend server for the first application from the processor of the second backend server for the second application, the prediction information;
   generating, by the processor of the first backend server for the first application based on the prediction information, push information;
   pushing, by the processor of the first backend server for the first application, the push information to a terminal where the first application and the second application are installed corresponding to the target user to enable the target user to view the push information on the terminal by a clicking operation;
   receiving, by the processor of the first backend server for the first application, a user request of the target user;
   receiving, by the processor of the first backend server for the first application, user behavior information; and
   in response to receiving the user behavior information, associating and storing, by the processor of the first backend server for the first application, an identifier of the user request and the user behavior information, wherein the user behavior information is used to characterize a behavior executed by the user for a jumping page, the jumping page is a page that the user jumps to after executing an operation on the push information;
   wherein the generating, based on the first user characteristic information of the target user, the anonymous user information of the target user comprises:
      inputting the first user characteristic information into a first prediction sub-model to obtain a first user characteristic embedding vector;
      splicing the first user characteristic embedding vector and a context vector to obtain a splicing vector;
      multiplying the splicing vector and a parameter matrix of the first prediction sub-model to obtain the anonymous user information of the target user.

2. The method according to claim 1, wherein the generating, by the processor of the first backend server for the first application based on the first user characteristic information of the target user, the anonymous user information of the target user comprises:
   obtaining, by the processor of the first backend server for the first application based on the first user characteristic information of the target user and object characteristic information of an object to be displayed, the anonymous user information of the target user.

3. The method according to claim 1, wherein the multiplying the splicing vector and the parameter matrix of the first prediction sub-model to obtain the anonymous user information of the target user comprises:
   multiplying the splicing vector and the parameter matrix of the first prediction model to obtain a multiplication vector;
   performing data compression on the multiplication vector to obtain the anonymous user information of the target user.

4. The method according to claim 1, wherein the generating, by the processor of the first backend server for the first application based on the first user characteristic information of the target user, the anonymous user information of the target user comprises:
   in response to receiving the user request of the target user, generating, by the processor of the first backend server for the first application based on the first user characteristic information of the target user, the anonymous user information of the target user.

5. The method according to claim 1, further comprising:
receiving, by the processor of the first backend server for the first application, user operation information for the push information;
in response to the user operation information characterizing that the user performs an operation on the push information, sending, by the processor of the first backend server for the first application, the identifier of the user request to the processor of the second backend server for the second application.

6. The method according to claim 1, wherein the first prediction sub-model is obtained by training through steps of:
inputting a first sample in a first sample set into a first prediction sub-network to obtain sample anonymous user information, wherein the first sample in the first sample set comprises the first user characteristic information;
inputting the sample anonymous user information and the second user characteristic information in a second sample corresponding to the first sample in a second sample set into a second prediction sub-network to obtain actual prediction information, wherein the second sample in the second sample set comprises the second user characteristic information and sample prediction information;
obtaining a loss value based on the actual prediction information and the sample prediction information in the second sample corresponding to the first sample in the second sample set;
optimizing the second prediction sub-network based on the loss value, and obtaining an intermediate gradient value;
optimizing the first prediction sub-network based on the intermediate gradient value;
in response to satisfying a training end condition, determining the optimized first prediction sub-network as the first prediction sub-model.

7. The method according to claim 5, further comprising:
associating and storing, by the processor of the first backend server for the first application, the identifier of the user request, the push information and the user operation information.

8. An electronic device, comprising:
one or more processors;
a storage apparatus, having one or more programs stored thereon,
wherein when the one or more programs are executed by the one or more processors, the one or more processors implement the method according to claim 1.

9. A non-transitory computer readable medium, having a computer program stored thereon, wherein when the computer program is executed by a processor, the method according to claim 1 is implemented.

10. A method for transferring information, applied to a second backend server for a second application, comprising:
receiving, by a processor of the second backend server for the second application from a processor of a first backend server for a first application, anonymous user information of a target user, wherein the anonymous user information is generated by the processor of the first backend server for the first application based on first user characteristic information of the target user;
generating, by the processor of the second backend server for the second application based on the anonymous user information and second user characteristic information of the target user, prediction information; wherein the first user characteristic information comprises information obtained from historical browsing information of the target user and login information of the target user on the first application, and a region where the target user is located, the second user characteristic information comprises the information obtained from the historical browsing information of the target user and the login information of the target user on the second application, and the region where the target user is located;
generating, by the processor of the second backend server for the second application based on the prediction information, push information;
pushing, by the processor of the second backend server for the second application, the push information to a terminal where the first application and the second application are installed corresponding to the target user to enable the target user to view the push information on the terminal by a clicking operation;
receiving, by the processor of the second backend server for the second application, user behavior information; and
in response to receiving the user behavior information, associating and storing, by the processor of the second backend server for the second application, an identifier of a user request and the user behavior information, wherein the user behavior information is used to characterize a behavior executed by the user for a jumping page, the jumping page is a page that the user jumps to after performing an operation on the push information;
wherein the anonymous user information of the target user is generated through steps of:
inputting the first user characteristic information into a first prediction sub-model to obtain a first user characteristic embedding vector;
splicing the first user characteristic embedding vector and a context vector to obtain a splicing vector;
multiplying the splicing vector and a parameter matrix of the first prediction sub-model to obtain the anonymous user information of the target user.

11. The method according to claim 10, wherein the generating, based on the anonymous user information and the second user characteristic information of the target user, the prediction information comprises:
inputting the anonymous user information and the second user characteristic information of the target user into a second prediction sub-model to generate the prediction information.

12. The method according to claim 10, further comprising:
receiving, by the processor of the second backend server for the second application, user operation information for the push information;
in response to the user operation information characterizing that the user performs an operation on the push information, sending, by the processor of the second backend server for the second application, the identifier of a user request to the processor of the first backend server for the first application.

13. The method according to claim 12, further comprising:
associating and storing, by the processor of the second backend server for the second application, the identifier of the user request, the push information and the user operation information.

* * * * *